United States Patent
Gray

(10) Patent No.: US 7,597,359 B2
(45) Date of Patent: Oct. 6, 2009

(54) GUIDE LOOP ASSEMBLY

(75) Inventor: Mark Gray, Sterling Heights, MI (US)

(73) Assignee: TK Holdings, Inc., Auburn Hills, MI (US)

( * ) Notice: Subject to any disclaimer, the term of this patent is extended or adjusted under 35 U.S.C. 154(b) by 23 days.

(21) Appl. No.: 11/519,911

(22) Filed: Sep. 13, 2006

(65) Prior Publication Data
US 2007/0114777 A1    May 24, 2007

Related U.S. Application Data

(60) Provisional application No. 60/717,698, filed on Sep. 16, 2005, provisional application No. 60/717,697, filed on Sep. 16, 2005.

(51) Int. Cl.
*B60R 22/00* (2006.01)
(52) U.S. Cl. .................................... 280/808
(58) Field of Classification Search ............ 280/808, 280/801.1, 801.2; 297/468, 482, 483
See application file for complete search history.

(56) References Cited

U.S. PATENT DOCUMENTS

| 5,601,311 | A | 2/1997 | Pfeiffer et al. |
| 6,702,327 | B2 | 3/2004 | Janz |
| 7,192,057 | B2* | 3/2007 | Moendel et al. ............ 280/808 |
| 7,416,217 | B2* | 8/2008 | Cord et al. ............... 280/801.1 |
| 2005/0012321 | A1 | 1/2005 | Moendel et al. |

* cited by examiner

*Primary Examiner*—Faye M. Fleming
(74) *Attorney, Agent, or Firm*—Foley & Lardner LLP

(57) ABSTRACT

A guide loop assembly for a seat belt has a core body with spaced front and rear flanges and an arcuate bearing surface for the seat belt extending therebetween. An arcuate shell cover is provided and has a concave configuration relative to the arcuate bearing surface. The shell cover extends between the front and rear flanges thereof The shell cover includes a bushing portion integrally connected by a flexible hinge to the concave core configuration portion. The integral hinge is connected to an impact cover as by threading a flexible portion of the hinge through a hinge portion such as a split pin on the impact cover. In a method assembly, the impact cover and shell cover are hinged together and mounted on the core. After the fastener is inserted through the assembly, the impact cover is pivoted about the hinge to cover a fastener for the assembly.

12 Claims, 17 Drawing Sheets

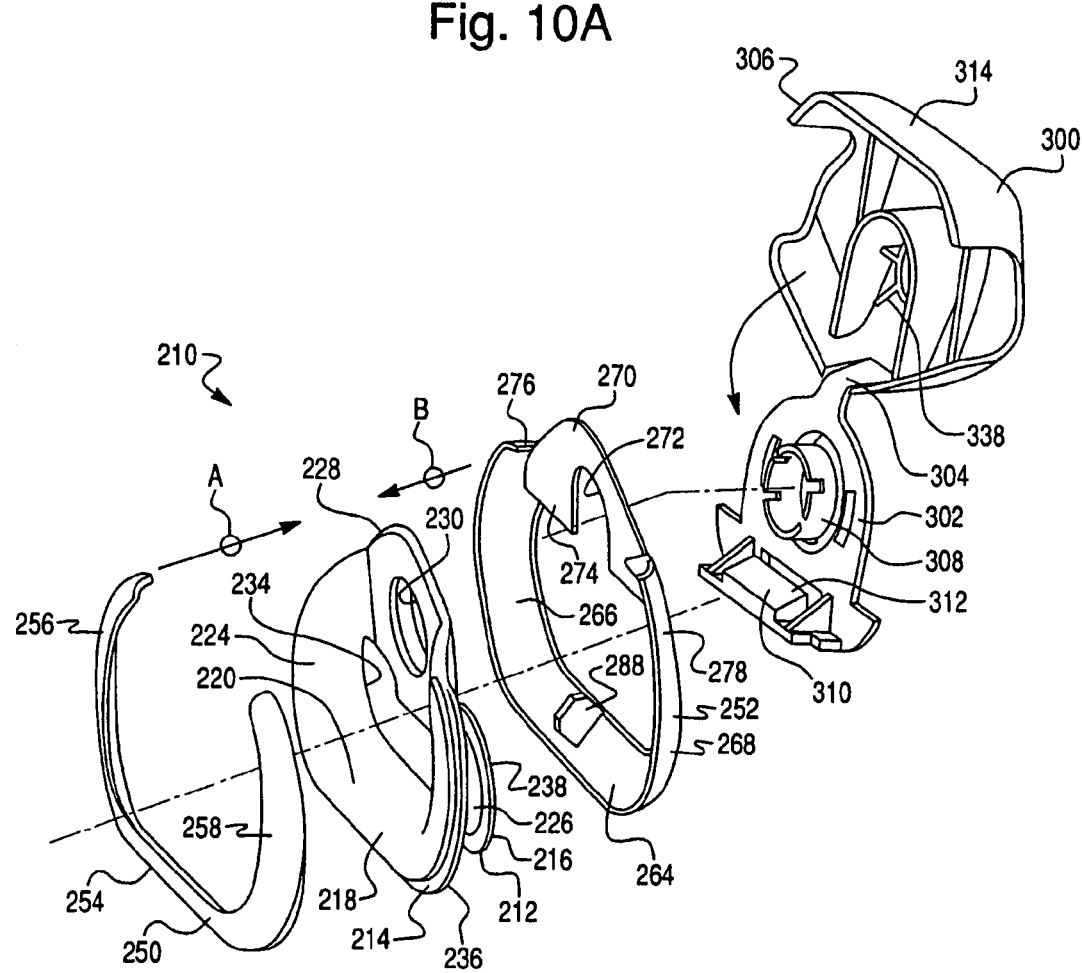

GUIDE LOOP ASSEMBLY

CROSS-REFERENCE TO RELATED PATENT APPLICATIONS

This application claims the benefit of and priority to U.S. Provisional Patent Application Nos.: 60/717,697, filed Sep. 16, 2005; and 60/717,698, filed Sep. 16, 2005; both of which are incorporated herein by reference in their entirety.

BACKGROUND

The present invention relates to a guide loop assembly for a seat belt system. More particularly, embodiments of the present invention relate to a guide loop assembly having a cover with an integral adapter piece. Embodiments of the present invention relate to a guide loop assembly having distinct front and back cover pieces.

Guide loop assemblies are mounted on the frame of a vehicle for directing a webbing such as a shoulder belt or seat belt above an occupant's shoulder. The guide loop assemblies, also known as "D-rings", are usually made with a load bearing steel core. The core has one end mounted to the vehicle's frame by a fastener and a separate opening that receives the seat belt.

One standard type of core has a curved, saddle-shaped, load-bearing wall to support the seat belt. The load-bearing wall faces the opening that receives the seat belt and provides a smooth turning point in the seat belt's pathway to permit easy adjustment of the seat belt. The curved, load-bearing wall extends away from the opening and forms an outer rim on the core with two generally parallel flanges spaced apart from each other. In contrast, other cores require extra plastic pieces or low-friction coatings to faun the seat that the seat belt rests on and slides against, adding to the expense of the assembly.

Known guide loop assemblies with the double-flange type of core have covers attached to the ends of the flanges to make the guide loop assembly more aesthetically pleasing and to match the decor of the interior of the vehicle. The covers also act to protect the core from wear and to protect an occupant who may impact the edges of the flanges on the guide loop assembly during a vehicle collision.

One such cover is described by U.S. Patent Publication No. 2005/0012321 to Moendel et al. which discloses a single cover piece clipped on, or injection molded with, both flanges of the core. The cover piece is designed so that the belt-bearing wall of the core straddles the solid piece of the cover under the core that completely fills the space between the flanges of the core. The single piece construction also has a complicated shape with a number of horizontal support ribs on one side and a protruding circular segment on the other side for abutting the bottom edges of the flanges of the core. Such a configuration is relatively expensive since it requires more material and adds complexity to the molds used to produce the cover piece.

Similarly, U.S. Pat. No. 6,702,327 issued to Janz requires a large number of components for the D-ring including a pair of side cover members that are slid laterally onto the D-ring from opposite sides thereof, a stop disk for limiting the angle of turning of the D-ring, an adapter having a collar for mounting about the bolt fasteners, and a cover cap. These large number of components require assembly, separate inventory and other considerations adding to the final cost of manufacture and assembly of the guide loop assembly requires unnecessary structure in the form of a spiraling wall as part of a core cover. The wall is disposed underneath the seat-belt bearing surface of the core, raising the cost of the assembly.

Some known guide loop assemblies also have energy absorbing adapters attached to the D-ring core for covering the fastener and D-ring core and positioned to absorb energy received from impact forces from an occupant's head hitting the guide loop assembly during a vehicle collision. Sometimes the adapter also extends over the belt receiving surface on the D-ring core to reduce the size of the opening receiving the seat belt to a thin slot in order to maintain the seat belt against the core's load bearing wall.

A number of these conventional energy absorbing adapters are distinct from the core and the other cover pieces on the core. These adapters have a back or base, a front cover piece and a bendable hinge piece connecting the top of the base to the top of the front cover. With these configurations, the energy absorbing adapter is assembled on the core by mounting the base on the rear of the core, and then bending the hinge to mount the front cover on the front of the core.

Another type of adapter is disclosed by U.S. Pat. No. 5,601,311 issued to Pfeiffer, which discloses molding a cover as a coating over most of the D-ring core and provide a hinged fastener cover that is integrally attached by the cover coating which is an ionomer plastic resin or other lubricous polymeric material such as DuPont's Bexloy W. The coating of material is molded over most of the core body. Because the cover is integral with the coating, it is also made from the same material as the coating. Rather than the belt sliding over a metal-double flanged guide loop surface, in this patent the belt slides over the plastic molded coating on the core.

Accordingly, a need exists for a more efficient construction of a guide loop assembly with a double-flanged core. More particularly, an aesthetically pleasing guide loop assembly that provides manufacturing and attendant cost efficiencies while protecting an occupant from injury would be desirable.

SUMMARY

One embodiment of the invention relates to a seat belt device. The seat belt device comprises a seat belt and a guide loop assembly for guiding and supporting the seat belt. The guide loop assembly includes: a load bearing body with a load bearing wall and an opening through which the seat belt passes; an integral and one-piece cover and base portion, the cover covers a lower portion of the load bearing body; a hinge portion integral with the cover and base portion and configured to allow a folding hinge movement of the cover relative to the base portion; and an impact protection cover mounted on a load bearing body.

Another embodiment of the invention relates to a guide loop assembly for a seat belt. The guide loop assembly comprises: a core body having spaced front and rear flanges and an arcuate bearing surface for the seat belt extending therebetween; and an arcuate shell having a concave configuration relative to the arcuate bearing surface and extending between the front and rear flanges thereof.

Yet another embodiment of the invention relates to a guide loop assembly for a seat belt. The guide loop assembly comprises: a body having a mounting opening for an anchor fastener and a bearing surface for the seat belt; an annular bearing member having a hinge for pivoting the bearing member to fit the opening; and an impact protection member for covering the mounting opening and anchor fastener therewith, and having a pivot portion for pivoting of the body thereabout.

Another embodiment of the invention relates to a guide loop assembly for a seat belt. The guide loop assembly comprises: a body having spaced front and rear flanges forming a space therebetween, and a bearing surface for the seat belt extending the front and rear flanges; a shell extending between the front flange and the rear flange for covering at least a portion of a space between the front and rear flanges; a base pivotally attached to the shell for pivoting the base relative to the shell and body to mount the base on the body; and a cover member distinct from the base member and attached to the base.

Yet another embodiment of the invention provides a guide loop assembly for a seat belt. The assembly comprises: a metal core body having a fastener-receiving opening and a belt bearing surface; a one-piece cover having a cover portion for covering a lower portion of the core body; a base portion integrally formed with the cover portion of the one-piece cover; a bushing portion on the base portion for being inserted into the fastener-receiving opening on the metal core body; an integral hinge portion on the one-piece cover between the bushing portion and the cover portion for a folding hinge movement relative to one another for positioning on the core body; and an impact protection cover mounted on the metal core body and positioned for impact by a passenger at the time of an accident.

Another embodiment of the invention provides a method of assembling a cover on a core body having a slot for a seat belt. The method comprises: providing the core body having a belt bearing surface portion and an opening for receiving a fastener; providing a first cover having a shell portion for covering the belt bearing surface position and having a hinges and a bushing portion for inserting into a fastener receiving opening in the core body; providing a impact protective, second cover for covering the fastener for the core body having a strap receiving member; attaching the first and second covers to one another at the hinge; positioning the shell portion to cover at partially the belt bearing surface portion of the core body and inserting the bushing portion into the fastener receiving opening; and positioning the impact protective cover over the fastener.

Another embodiment of the invention provides seat belt device. The device comprises a seat belt and a guide loop assembly for guiding and supporting the seat belt. The guide loop assembly includes: a load bearing body with a load bearing wall and an opening through which the seat belt passes; a cover shell portion to cover at least a portion of the load bearing member; an impact protection member; and a base portion. The base portion includes an integrally formed hinge configured to form a folding hinge connection with the impact protection member or the cover shell portion.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 10A is an exploded, perspective view of the guide loop assembly of FIG. 9.

DETAILED DESCRIPTION

Figure 1:
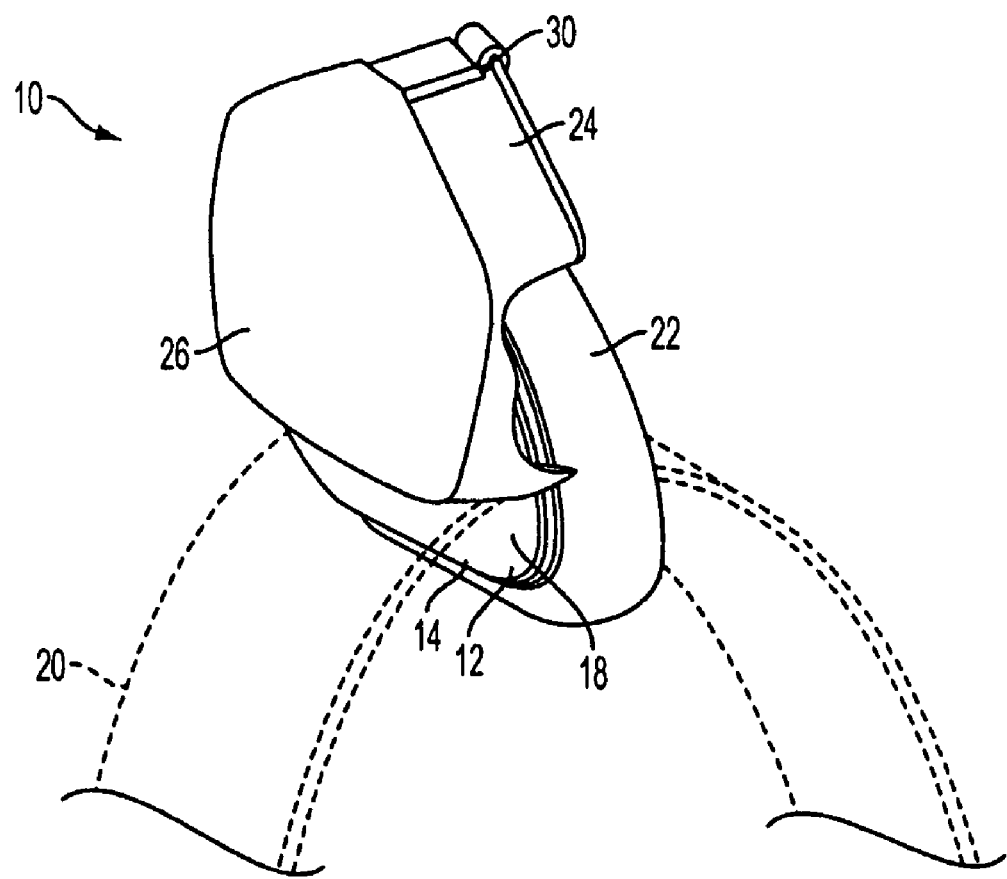
FIG. 1 is a front and right perspective view of a fully assembled guide loop assembly.

According to one disclosed embodiment, a guide loop assembly has a D-ring core body with spaced front and rear flanges and an arcuate bearing surface for the seat belt extending therebetween. An arcuate cover shell is provided with a concave configuration relative to the arcuate bearing surface and extends between the front and rear flanges to cover the same. With this configuration, the cover shell is relatively inexpensive since it does not fill the space between the front and rear flanges with any significant amount of material. This design can provide a safe, inexpensive and aesthetically pleasing cover for the flanges on the load bearing body.

In another embodiment, the cover shell includes a shell portion 22 and an energy absorbing adapter portion 24 integral with the shell portion. In one example, the two portions are attached by an integral hinge connector 30 and the adapter portion is pivoted at the hinge connector when mounting the adapter portion on the D-ring body.

In a more specific example, the D-ring body 12 has a mounting opening for an anchor fastener and the guide loop assembly has an annular bearing member which is into the opening in a D-ring body. A guide member or an impact protection member (or a member that functions as both) is distinct from the annular bearing member in one embodiment and is mounted on the body. The guide member or impact protection member has a pivot portion for pivoting of the body about the pivot portion. With this configuration, the hinged attachment of the annular bearing member secures the guide member or impact protection member to the body at the pivoting portion while permitting the pivoting of the body relative to the guide member or protection member (or vis-a-vis) to mount the guide member or protection member on the body.

In accordance with one embodiment, a one-piece shell cover portion for covering the belt loop and a bushing cover portion for receiving the fastener are connected by a flexible hinge. An impact protection cover for covering of the fastener and the front of the assembly is pivotable at the hinge for movement from a fastener access position to a closed, covering position. Preferably, the hinge connection comprises a flexible hinge strap on the one-piece cover and a split pin having a threading slot on the impact cover.

In accordance with a further embodiment, there is provided a method of a hinging assembly of an impact cover and the shell, bushing cover and their positioning on the core.

In another embodiment, the guide loop assembly has a D-ring, core body with spaced front and rear flanges forming a space therebetween, and a bearing surface for the seat belt extending therebetween. A cover shell extends between the front flange and the rear flange for covering at least a portion of a space between the front and rear flanges. A base is pivotally attached to the shell for pivoting the base relative to the shell and body to mount the base on the body. In addition, a cover member distinct from the base member is attached to the base. These configurations provide a simple, inexpensive way to assemble the guide loop assembly while providing an aesthetically pleasing design.

In yet another embodiment, a guide loop assembly for a seat belt has a D-ring body generally including front and rear sides and a belt bearing surface configured for supporting the seat belt to extend between the front and rear sides of the body. A front cover member is mounted to cover at least a portion of the front side of the body, while a rear cover member is mounted to cover at least a portion of the rear side of the body. The rear cover member is distinct from the front cover member. This design can provide a safe, inexpensive and aesthetically pleasing cover for the load bearing body.

In another embodiment, the seat belt extends through an opening in the body in a fore and aft direction (or in other words from the front and rear sides of the body in contrast to a side-to-side or lateral direction). The front and rear cover members are configured to be moved or shifted in the fore and aft directions for mating to the body during assembly. This is in direct contrast with the Janz '327 patent that mates its profiles laterally to cover the core of the guide loop assembly.

In an additional embodiment, the body may have front and rear flanges that extend along its periphery. Front and rear decorative cover portions respectively cover the front and rear flanges along the periphery of the D-ring body.

In accordance with an embodiment, a D-ring assembly is provided with front and rear covers that are interlocked to capture a metal guide loop therebetween, a bolt or fastener used to secure the D-ring assembly to the vehicle and a belt receiving slot in the guide loop are covered by another cover member, preferably having an energy absorbing adapter covering the fastener. In this embodiment, the front and rear covers may be snap-fit or welded together to capture the metal guide loop therebetween. The preferred another cover member has energy absorbing features and is hinged to a base member which is positioned behind the rear cover member.

In yet a further aspect, a snap-fit connection between the front and rear cover members clamps the covers onto the body. This may be accomplished by using a hooked tab and hole connection at least at two separate locations, such as two spaced shoulders or upper ends on U-shaped front and back covers. Additionally, a hooked tab may be provided and extending in the fore and aft direction on one cover engages a hole on the other cover at a third location, such as underneath the load-bearing beam on the body, providing a three point connection and safely securing the covers to the body even if one of the connections is unintentionally disengaged. These configurations provide a simple, inexpensive way to assemble the guide loop assembly while providing an aesthetically pleasing design.

Various exemplary embodiments will be described below with reference to the drawings.

Figure 2:
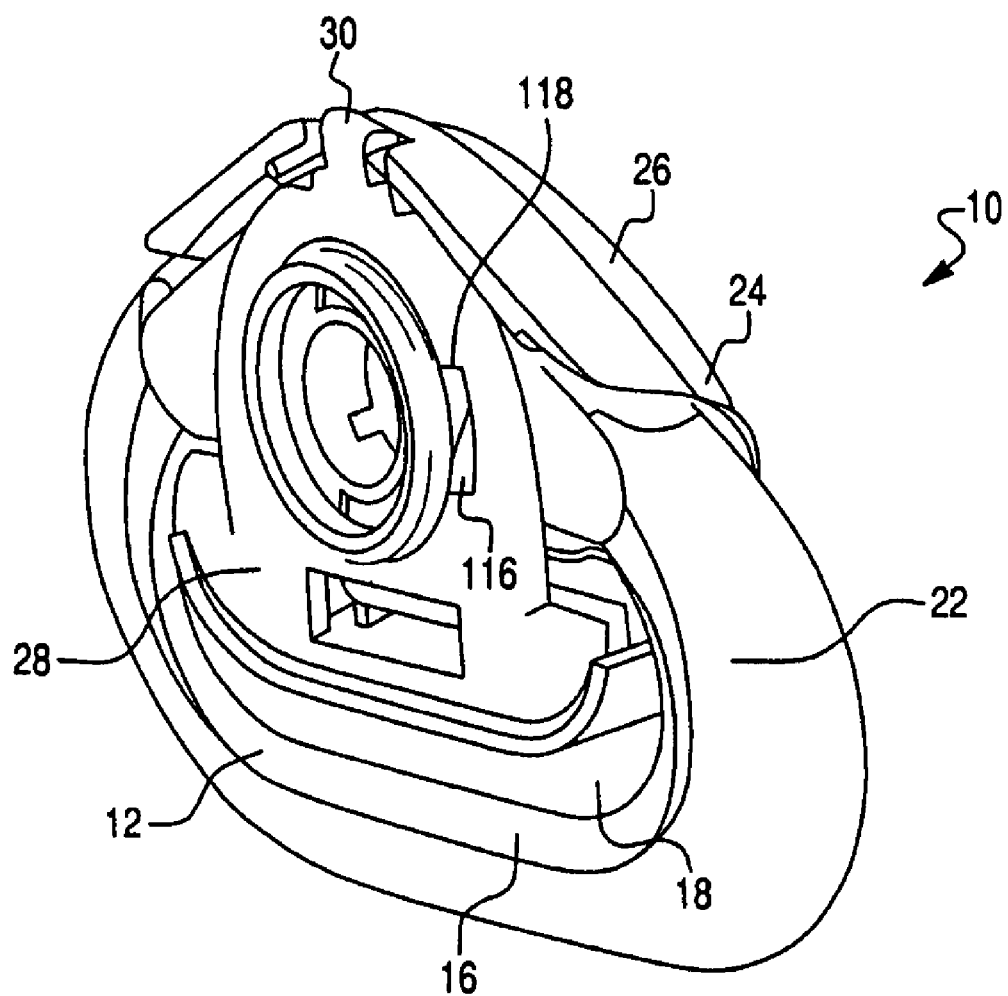
FIG. 2 is a rear and left perspective view of the fully assembled guide loop assembly of FIG. 1.

Referring to FIGS. 1-2, a guide loop assembly 10 has a load-bearing body 12 that generally foams a front side 14 and a rear side 16. The body 12 has a load-bearing wall 18 for a seat belt 20 to ride or slide on while extending through the guide loop assembly. A shell 22 and an adapter 24 are mounted on the body 12. The adapter 24 includes both a cover member 26 (also referred to as a guide member or impact protection member) and a base 28 (shown in FIGS. 2 and 3). In one embodiment, a hinge connection or portion 30 attaches the base 28 to the shell 22 such that the base is integral with (i.e. integrally formed with) the shell 22.

Figure 3:
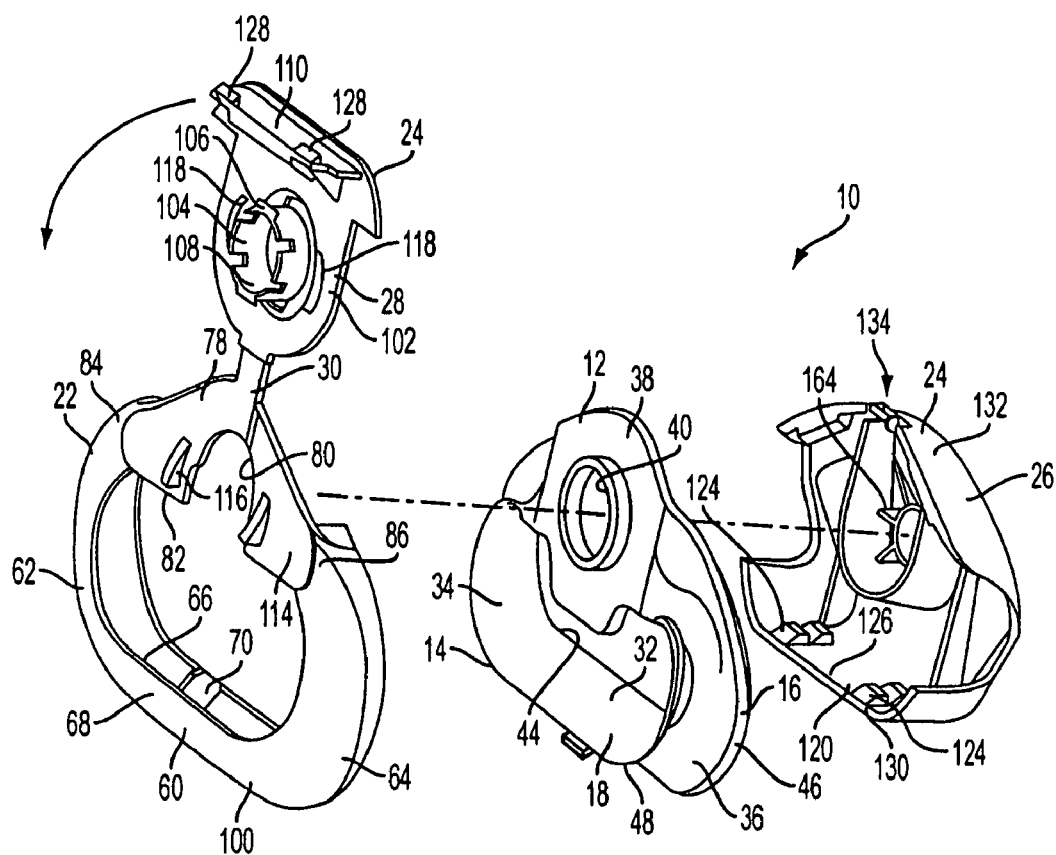
FIG. 3 is an exploded, rear perspective view of the guide loop assembly of FIG. 1.
Figure 4:
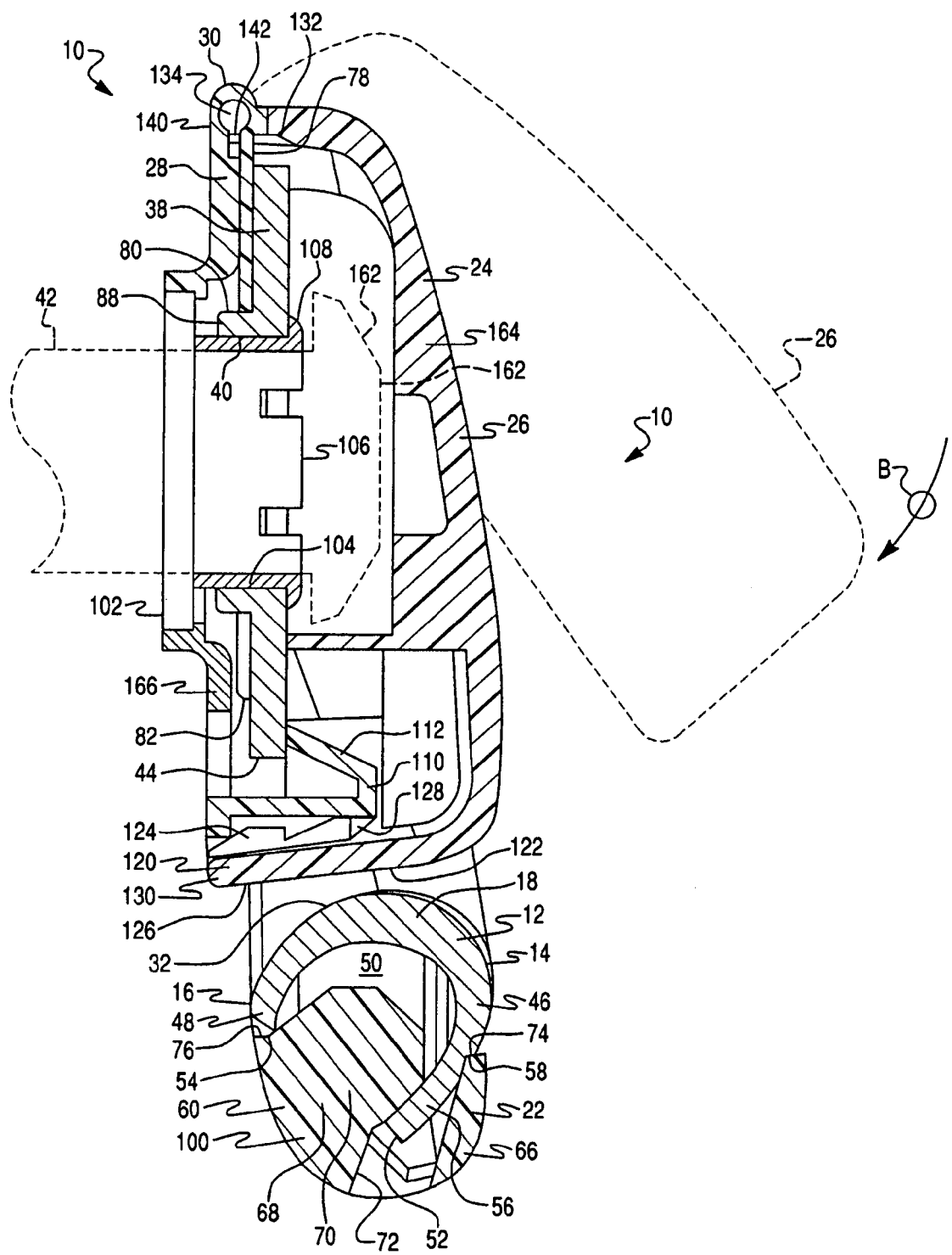
FIG. 4 is a central, cross-sectional, side view of the assembled guide loop assembly of FIG. 1 and showing an adapter and shell mounted on a core.
Figure 5:
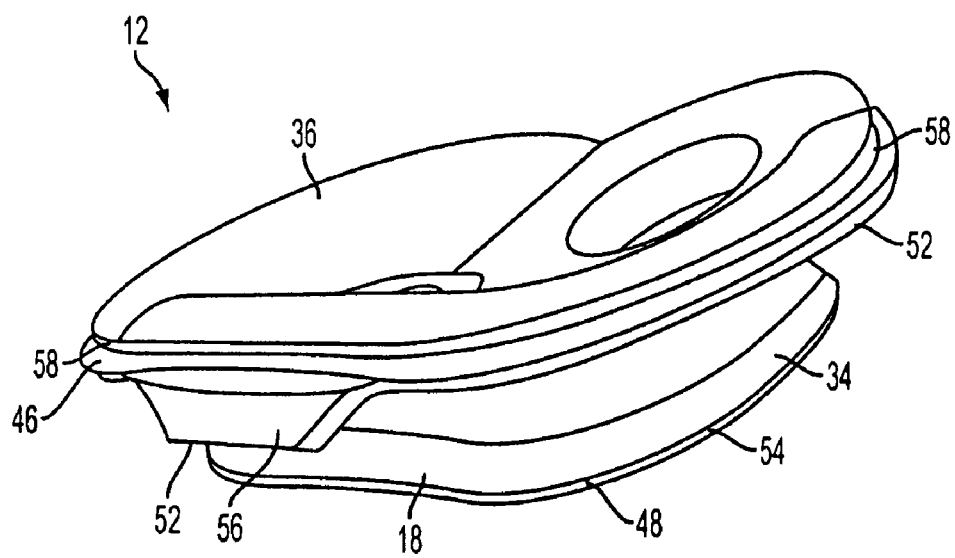
FIG. 5 is a bottom, front perspective view of a core for the guide loop assembly of FIG. 1.

Referring to FIGS. 3-5, the load-bearing wall 18 of the body 12 is curved or arcuate in cross-section (seen best in FIG. 4) with an upper belt-bearing surface 32 used to support the seat belt 20 (or other elongated webbing as shown in FIG. 1) as the seat belt extends between the front and rear sides 14, 16 of the body. Viewing the body 12 from the rear (FIG. 3), the bearing wall 18 is generally linear (from left to right) and is connected to two curved ends 34, 36. The wall 18 and ends 34, 36 cooperate to generally form a U-shape.

The ends 34, 36 of the body 12 extend upward until they attach to an upper mounting plate 38. The plate 38 has a circular opening 40 that receives an anchor fastener or bolt 42 (shown in dash in FIG. 4) extending from a wall of a vehicle (not shown) so that the guide loop assembly 10 can be mounted on the vehicle.

A belt opening 44 on the body 12 spaces the mounting plate 38 from the bearing surface 32, and receives the seat belt 20 from the front and rear sides 14, 16 of the body 12. In one embodiment, the bearing surface 32 faces the opening 44 so that the seat belt 20 sits directly on top of the bearing surface 32. For this purpose, the body 12 is made of steel or other metal with a low friction finish but can be made of other types of materials that have sufficient strength to withstand the forces exerted by the seat belt while permitting the seat belt to slide on the body.

As shown in FIGS. 3-4, the belt bearing wall 18 curves outward and downward to form a front flange or rim 46 on the front side 14 of the body 12 and a rear flange or rim 48 on the rear side 16 of the body. The flanges 46, 48 extend along the curved ends 34, 36 on the body 12 and are generally parallel to each other such that a space 50 exists between them. Each flange 46, 48 has an outer periphery 52, 54, respectively.

As shown in FIG. 5, the front periphery 52 on the front flange 46 extends along a curved extension or tab 56 that widens the front flange 46. An elongated groove 58 runs along the length of the front flange 46 and generally parallel to the front periphery 52. The groove 58 is uniformly spaced back from the periphery 52 except at the base of the tab 56.

Figure 6:
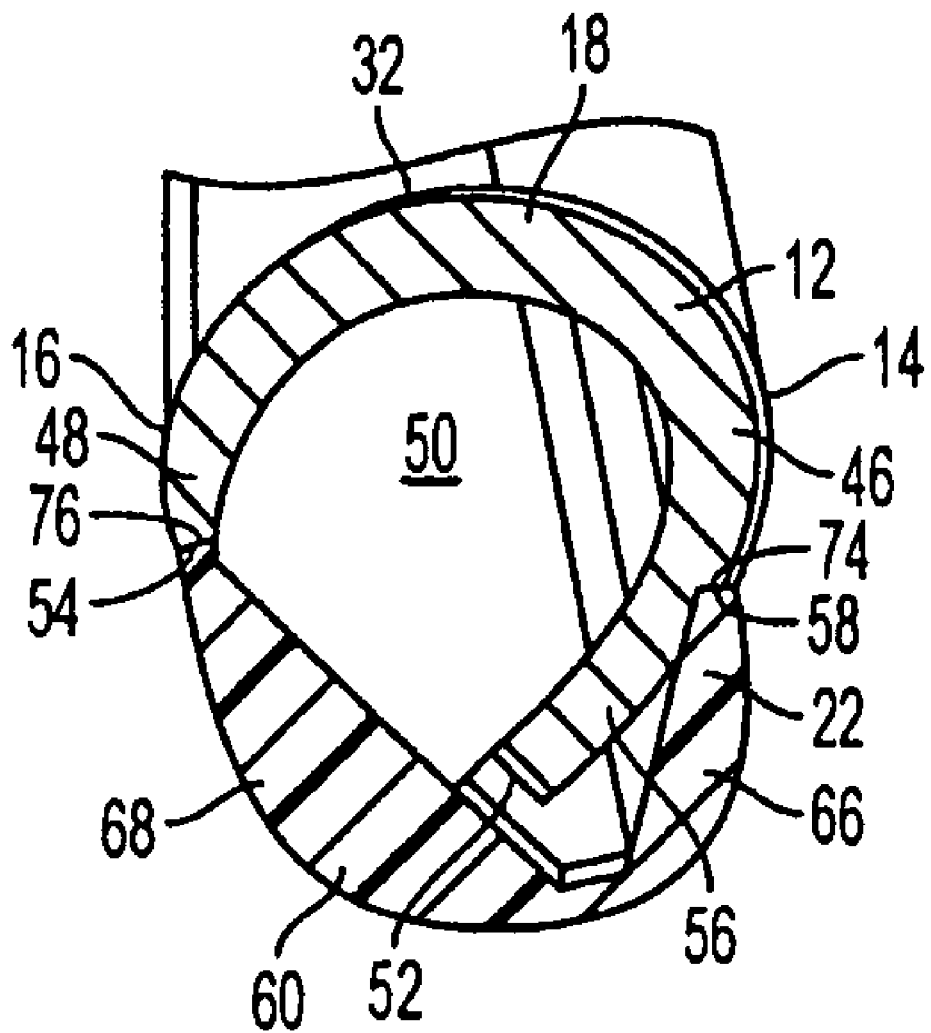
FIG. 6 is an off-center, cross-sectional side view of a lower portion of the guide loop assembly of FIG. 1.

Referring to FIG. 3, viewing shell 22 from the rear, it has a horizontal, linear, bottom beam 60 attached to two upwardly extending, curved pieces 62, 64 to generally form a U-shape that aligns with the bearing wall 18 and the curved ends 34, 36 on the body 12. As shown in FIG. 6, the beam 60 has a concave configuration (relative to the arcuate bearing wall 18) with an arcuate, generally U-shaped cross-section, a front rim 66 and a rear rim 68.

Referring again to FIG. 4, at the center of beam 60, the beam has an upwardly extending support fin 70 that fits within space 50 between the front and rear flanges 46, 48 of the body 12. The support fin 70 is shaped to at least generally position and hold the shell 22 on the bearing wall 18 of the body 12. In one embodiment, the support fin 70 also cooperates with the front rim 66 to grasp the front flange 46 of the bearing wall 18. For this purpose, this configuration contemplates the support fin 70 being smaller than space 50 so that the fin has a slight amount of room (in the front-to-back and up-down directions) to shift within space 50 between the flanges 46, 48. However, it will be appreciated that the support fin 70 may be sized to provide a tight or snug snap-fit within space 50. A tool hole 72 is merely provided on the shell 22 in order to provide a mold to form the support fin 70 during manufacture of the shell.

Referring to FIGS. 4 and 6, the front and rear rims 66, 68 of the shell 22 are respectively connected to the flanges 46, 48 of the body 12. More specifically, an upper edge 74 on the front flange 46 extends along and engages the groove 58. In this position, the front rim 66 covers the front periphery 52 of the front flange 46 of the bearing wall 18. An upper edge 76 of the rear rim 68 engages the rear flange 48 of the load-bearing wall 18 at its periphery 54.

This configuration efficiently provides an aesthetically pleasing shape by eliminating material from within space 50 while covering at least a portion of the flanges 46, 48, and enclosing the space 50. It will be appreciated, however, that the rims 66, 68 may only cover certain areas or portions of the front and rear rims 36, 38 of the body 12 or the space 50. Thus, the shell 22 may have patterned or arrayed structures, holes or beams, or may not cover or attach to, the entire length of the flanges 46, 48 so that only certain portions of space 50 are covered rather than completely enclosing it to further save material costs or to provide a more aesthetically pleasing embodiment.

Referring again to FIG. 3, the shell 22 also has a hanger plate 78 with a central groove or cut-out 80 that opens at a bottom edge 82 of the hanger plate 78. Upper ends 84, 86 of the curved pieces 62, 64 attach to opposite sides of the hanger plate 78, and in one embodiment, the hanger plate 78 is integrally formed with the upper ends 84, 86.

Referring to FIG. 4, the hanger plate 78 is mounted on a rearwardly extending collar 88 on the body 12 and around the mounting opening 40. The cut-out 80 is provided so that the hanger plate 78 avoids interfering with the anchor fastener 42 while providing stability to the shell 22 and an additional location to mount the shell 22 to the body 12.

As shown in FIGS. 3 and 4, the adapter 24 includes the base 28 connected by the hinge connection 30 to the hanger plate 78 of the shell 22. Thus, in one embodiment, the hinge 30 and the base 28 is integrally formed with the shell 22. In this case, all of the elements of the shell, but at least the main beam 60 and rims 66, 68 mounted under the load bearing wall 18 of the body, form a shell portion 100 that is integrally formed with an adapter portion 102 made of the base 28 or any other structure that forms part of the adapter 24 and is to be mounted on the body 12.

For one embodiment, the hinge connection 30 is a flexible, thin strip or strap of the same material that forms the adapter portion 102 and the shell portion 100. Other mechanical substitutes are contemplated, however, such as interlocking, pivoting or bending plates or members, with or without a pivot pin, or any other equivalent structure that permits the adapter portion 102 to pivot relative to the shell portion 100, and in turn the body 12, while the hinge connection 30 connects the adapter portion 102 to the shell portion 100.

Base 28 has an annular bearing member 104 that has a distal end 106 with a plurality of hooks 108. The annular bearing member 104 extends through opening 40 on the body 12 to mount the base 28 on the rear side 16 of the body 12 while using the hooks 108 to engage and clamp onto the front side 14 of the body 12 on the upper mounting plate 38. The annular bearing member 104 is sized to permit the guide loop assembly 10 to rotate about the anchor fastener 32.

The base 28 also has a locking tab 110 extending within opening 44 on the body 12 and has a hooked end 112 turned back to engage the upper mounting plate 38 on the front side 14 of the body in order to further secure the base 28 to the body.

Referring to FIGS. 2-3, a back side 114 of the hangar plate 78 on the shell 22 has two spaced, ramped, guide projections 116 that respectively engage two guide slots 118 formed on the base 28 (FIG. 2). These connections are provided to maintain alignment between the shell 22, and in turn the body 12, and the base 28 of the adapter 24 when the base is mounted on the body 12 (as shown in FIG. 4) and when the guide loop assembly 10 is being rotated about fastener 42.

Referring again to FIGS. 3-4 and 8, the hinge 30 can be bent as shown by arrow A in FIG. 8, so that the base 28 is mounted on the rear side 14 of the body 12 while the cover member 26, which also forms part of the adapter 24, is mounted on the front side 16 of the body 12 and is attached to the base 28 through and over the body 12. The cover member 26 is mounted on the front side 14 of the body 12 by attaching to the tab 110 on the base 28 and by attaching to the hinge connection 30. This configuration clamps and secures the hanger plate 78 of the shell 22 and the upper mounting plate 38 of the body 12 between the base 28 and the cover member 26.

The cover member 26 has a bottom wall 120 that extends through the opening 44 for the seat belt 20. The wall 120 is spaced from the bearing surface 32 so that a thin slot 122 (FIG. 4) is formed between them to restrict the vertical movement of the seat belt 20 on the guide loop assembly 10 and to maintain the seat belt in alignment with and/or in contact with the bearing surface 32. Due to this function, the cover member 26 may also be referred to as a guide member.

The cover member 26 is secured to the base 28 at its lower end 130 by providing a pair of spaced, upwardly extending projections 124 on an interior face 126 of the bottom wall 120 that interlocks with a corresponding pair of projections 128 extending downward from locking tab 110.

Figure 7:
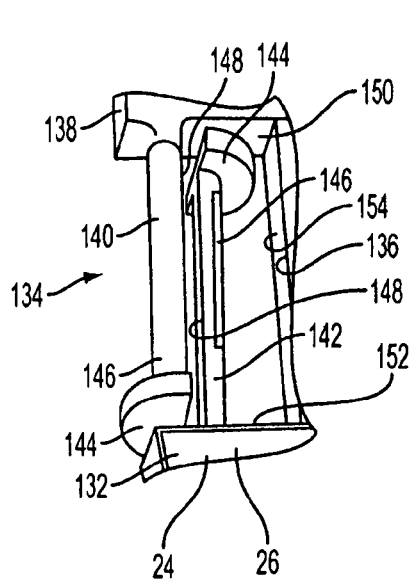
FIG. 7 is a top, close-up perspective view showing a portion of an adapter cover member of the guide loop assembly of FIG. 1.
Figure 8:
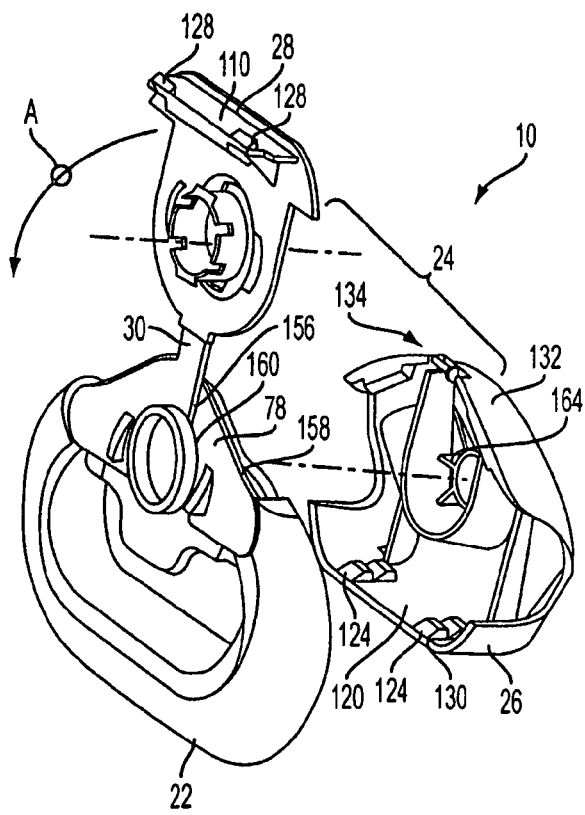
FIG. 8 is a partially exploded, rear perspective view of the guide loop assembly of FIG. 1.

Referring to FIGS. 3, 7 and 8, on the upper end 132 of the cover member 26, the cover member has a pivot portion 134 disposed within an indent 136 along a top edge 138 of the cover member 26. The pivot portion 134 includes at least one pivot shaft, but in one embodiment, two elongated pivot shafts 140, 142 with one shaft 142 lying forward the other shaft 140. The pivot shafts 140, 142 have a semi-circular cross-section with enlarged, semi-circular heads 144 at their distal, cantilevered ends 146 of the shafts. Opposing, elongated, flat surfaces 148 on the shafts 140, 142 run the length of the shafts. The shafts 140, 142 are oppositely disposed relative to each other such that they extend from opposing sidewalls 150, 152 of the indent 136.

The shafts 140, 142 are also sufficiently elastic so that they can be bent out of the way in order to place the hinge strap 30 between the forward-most shaft 142 and a back wall 154 of the indent 136. For this purpose, the hanger plate 78 has an elongated gap 156 (FIG. 8) running vertically from a top edge 158 to an edge 160 forming the cut-out 80. This permits further lateral bending or twisting of hinge 30, and in turn hanger plate 78 if needed, to position the hinge 30 within the pivot portion indent 136. It will be appreciated that the gap 156 may be shorter than the entire height of the hanger plate 78 or may even be eliminated depending on the structure and materials forming hinge 30. Once hinge 30 is positioned in indent 136, the base 28, and in turn its annular bearing member 104, can be pivoted to mount the base 24 on the body 12 by bending the hinge strap 30 around the two shafts 140, 142 as shown in FIG. 4. This clamps the shafts 140, 142 together against their opposing flat surfaces 148.

In this position, the upper end 132 of the cover member 26 is firmly secured to the shell 22 and base 28, and in turn the body 12, while still being able to pivot (as shown by arrow B in FIG. 3) relative to the shell base and body (or vis-a-vis) so that the lower end 130 of the cover member 26 can be secured to the tab 110 of the base. The enlarged heads 144 of the shafts 140, 142 prevent the hinge strap 30 from sliding laterally and off of the shafts.

When assembling the covers 22 and 24 with the core 12, the flexible strap 30 may be threaded through the split pin on the energy absorbing adapter to hinge connect these two separate, distinct covers. The lower shell portion, as seen in FIG. 3, may be raised to cover the lower belt guide loop of the core. Then upper bushing portion of the shell portion may be swung down to insert the bushing into the fastener receiving opening 40 in the core 12 thereby providing a preassembly of the covers with the core. At installation on the vehicle, the bolt fastener 42 is threaded through lined bushing 40 and threaded to the vehicle and then the impact protection cover 26 is pivoted down and latched or snap fitted at snap fit projections 124, 128 to cover the bolt head and to secure the cover member 26 to the shell cover 22.

Referring to FIGS. 3-4, in one embodiment the cover member 26 is shaped to cover the mounting hole 40 while abutting or opposing the end 162 of the anchor fastener 42. The cover member 26 has internal energy absorbing fins 164 in order to absorb energy received from forces from an occupant impacting on the cover member 26. For this function, the cover member 26 may also be referred to as an impact protection member. It will be appreciated however that the adapter 24 may perform one of the functions mentioned above (guide or protect), both of these functions or neither of them, and may merely be used for aesthetic reasons.

It will be appreciated that the guide loop assembly 10 still falls within the scope of the invention even though it may be anchored to a vehicle in other ways than simply mounting the assembly on an anchor fastener or anchor bolt on the wall of a vehicle.

Figure 9:
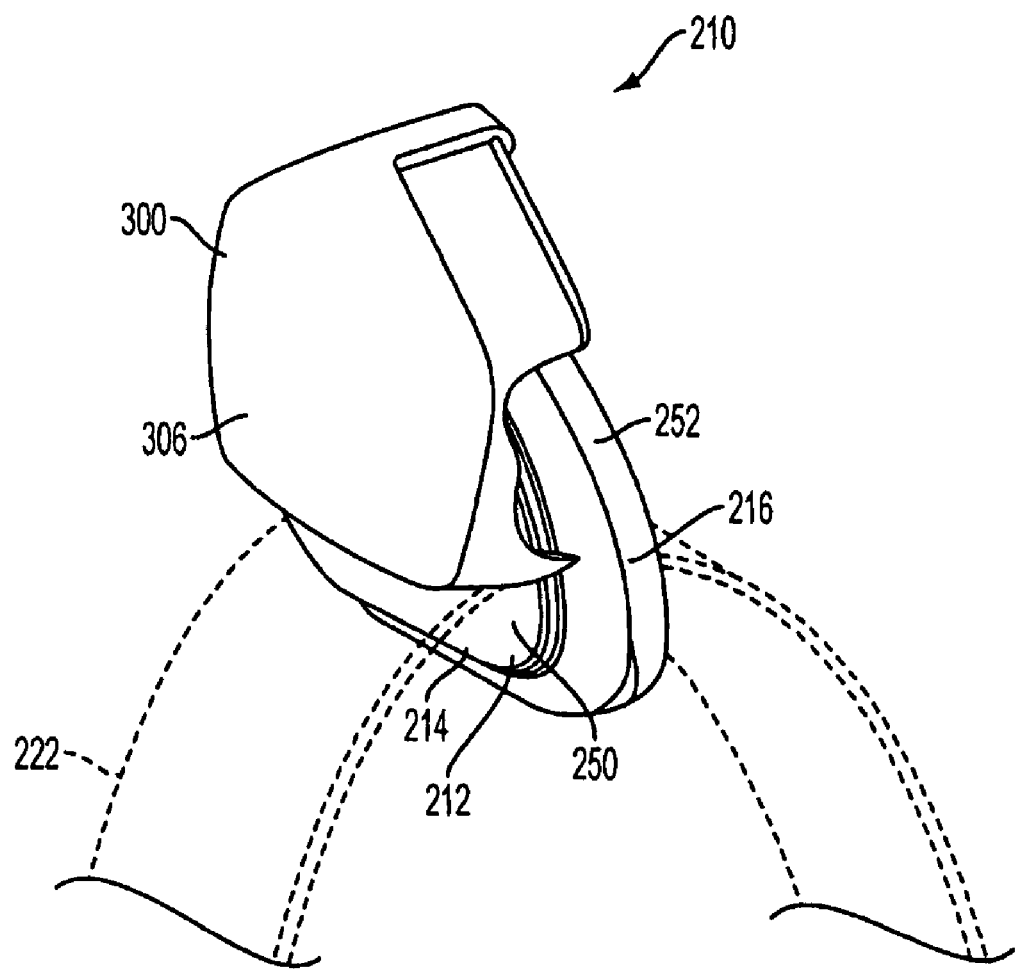
FIG. 9 is a front and right perspective view of an alternative embodiment of a fully assembled guide loop assembly.
Figure 10B:
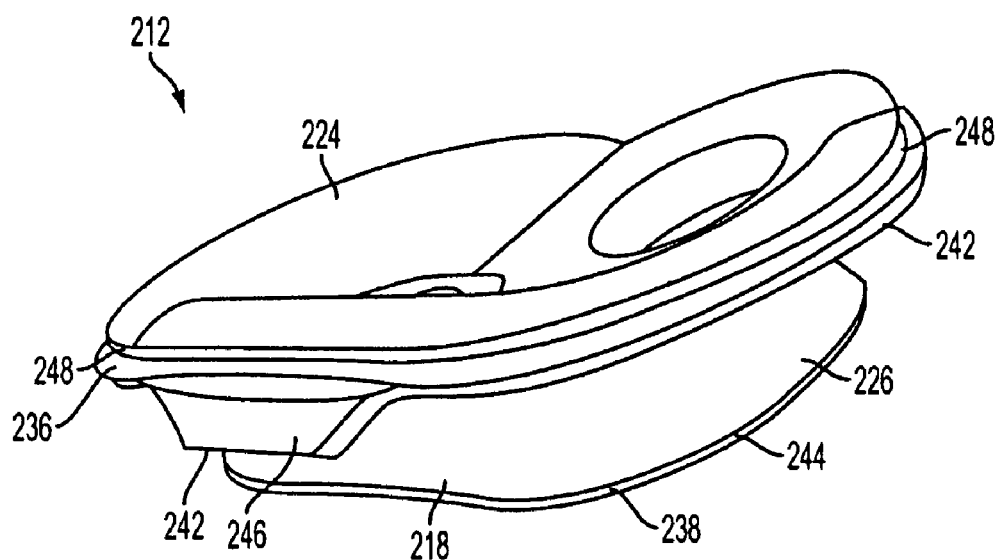
FIG. 10B is a bottom, perspective view of a load-bearing body for the guide loop assembly of FIG. 9.

Referring to FIGS. 9-10B, a guide loop assembly 210 includes a load-bearing, D-ring body 212 clamped between a front cover member 250 and a rear cover member 252 that is distinct from the front cover member. The body holds a seat belt 222 extending through it and also has an energy-absorbing adapter 300 mounted on the body 212 to restrict the space for the seat belt 222 to move on the body and to absorb energy if struck by a passenger's head during an accident. Each of these parts is described in further detail below.

The D-ring body 212 is usually made of metal and generally includes a front side 214 and a rear side 216. The body 212 also has a curved or arcuate load-bearing wall 218 (seen best on FIG. 10A) with an upper belt-bearing surface 220 used to support a seat belt 222 (or other elongated webbing) as the seat belt 222 extends between the front and rear sides 214, 216 of the body 212. Viewing the body 212 from the front, the bearing wall 218 is generally linear (from left to right) and is connected to two curved ends 124, 226. The wall 218 and ends 224, 226 cooperate to generally form a U-shape.

The ends 224, 226 of the body 212 extend upward until they attach to an upper mounting plate 228. The plate 228 has a circular opening 230 that receives an anchor fastener or bolt 232 (shown in dash on FIG. 11A) extending from a wall of a vehicle (not shown) so that the guide loop assembly 210 can be mounted on the vehicle.

A belt opening 234 on the body 212 spaces the mounting plate 228 from the bearing surface 220, and receives the seat belt 222 from a fore and aft direction. Arrows A and B on FIG. 10A generally indicate the fore and aft (or front and rear) directions, respectively, relative to the front and rear sides 214, 216 of the body 212. In one embodiment, the bearing surface 220 faces the opening 234 so that the seat belt 222 sits directly on top of the bearing surface 220. The body 212 is made of steel, but can be made of other types of metals or materials that have sufficient strength to withstand the forces exerted by the seat belt at the time of loading of the seat belt by the passenger's body at the time of an accident.

Figure 11A:
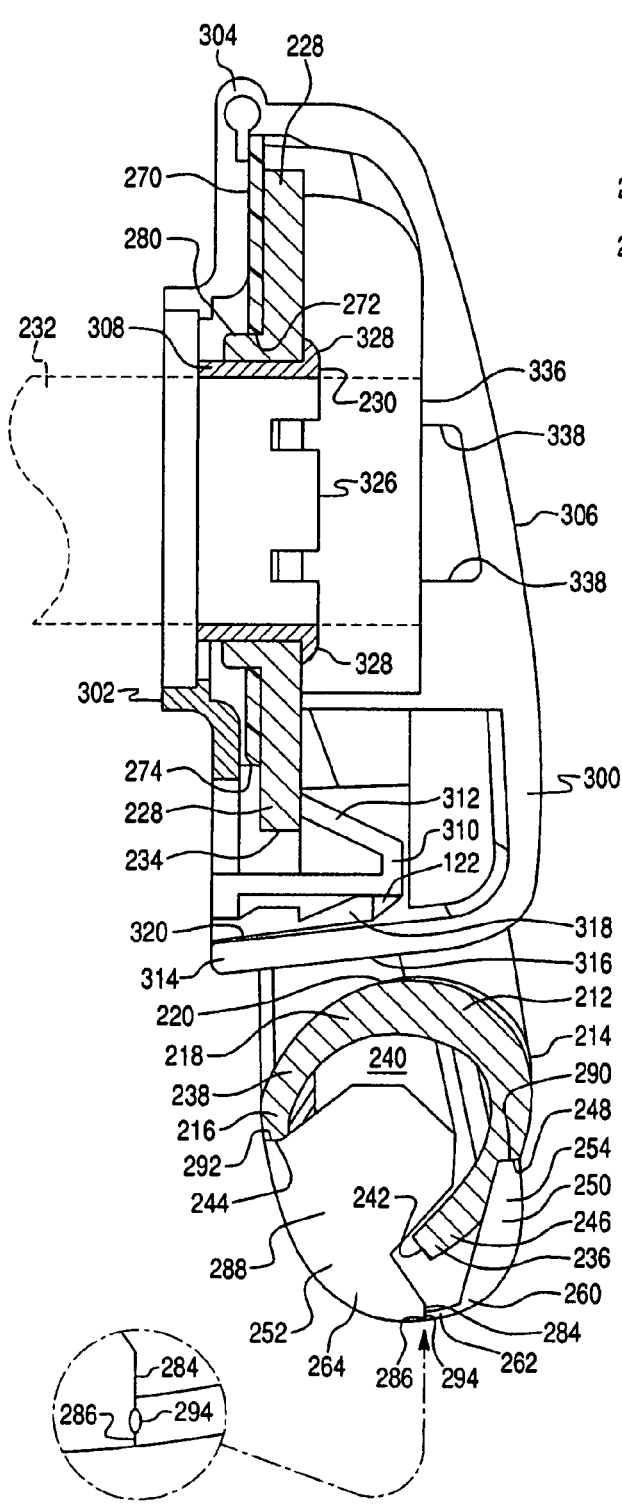
FIG. 11A is a central, cross-sectional, side view of the assembled guide loop assembly of FIG. 9 and showing an adapter and cover members mounted on a core body and a sonic weld connection between the cover members.
Figure 12:
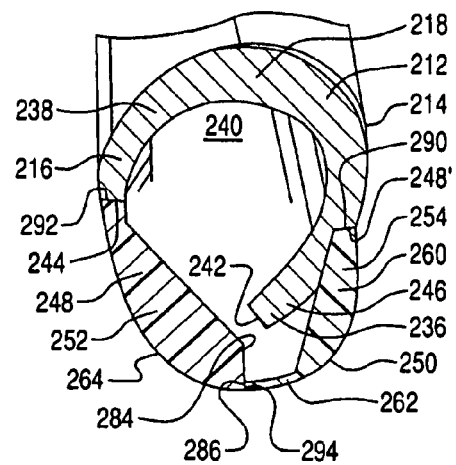
FIG. 12 is an off-center sectional, side view of a lower rim portion of the assembled guide loop assembly of FIG. 9 and showing the welded connection between the cover members.
Figure 11B:
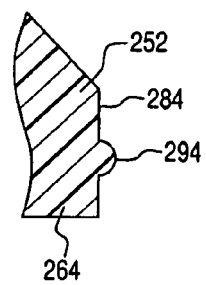
FIG. 11B is a close-up, cross-sectional view of a welding concentrator on a rim of one of the cover pieces for the guide loop assembly of FIG. 9.

As shown on FIGS. 11A-12, the belt bearing wall 218 extends outward and downward to form a front flange or rim 236 on the front side 214 of the body 212 and a rear flange or rim 238 on the rear side 1216 of the body. The rims 236, 238 extend along the curved ends 224, 226 on the body 212 (best seen in FIG. 10A) and are generally parallel to each other such that a space 240 exists between them. Each rim 236, 238 has an outer periphery 242, 244, respectively.

In the perspective view of FIG. 10B, it will be seen that the D-ring body 212 has the outer extending periphery 242 on the front rim 236 extends along a curved extension or tab 1246 that widens the front rim 236. An elongated groove 248 runs along the length of the front rim 236 and generally parallel to the front periphery 242. The groove 248 may be generally uniformly spaced back from the periphery 242 except at the base of the tab 246.

Referring again to FIG. 10A, the guide loop assembly 210 has a front cover member 250 mounted on the front side 214 of the body 212, and a rear cover member 252 mounted on the rear side 216 of the body. The front and rear cover members 250, 252 engage each other to clamp onto the body 212, as will be explained hereinafter.

Viewing the front cover member 250 from the front, it has a horizontal, linear, bottom beam 254 attached to two upwardly extending, curved pieces 256, 258 to generally form a U-shape that aligns with the bearing wall 218 and the curved ends 224, 226 on the front side 214 of the body 212.

Referring to FIGS. 11A and 12, the bottom beam 254 of the front cover member 250 has an inwardly slanted, curved, or generally L-shaped cross-section with a front portion 260 generally extending along and covering at least portions of the front side 214 of the D-ring body 212. A bottom portion 262 of the beam 254 generally extends beneath the body 212 in order to cover at least portions of the front rim 236 and front periphery 242 of the metal guide loop flange.

Referring again to FIG. 10A, the rear cover member 252, which is a distinct component from the front cover member 250, is adapted to be mounted on the rear side 216 of the body 212. Viewed from the front, the rear cover member 252 has a bottom beam 264 attached to two, upwardly extending curved pieces 266, 268 also generally forming a U-shape with beam 264 and that aligns with the rear side 216 of the body 212.

The rear cover member 252 also has an upper hanger plate 270 for mounting the rear cover member on the D-ring body and the upper hanger plate has a central groove or cut-out 272 that opens at a bottom edge 274 of the hanger plate. Upper ends 276, 278 of the curved pieces 266, 268 attach to opposite sides of the hanger plate 270, and in one embodiment, the hanger plate 270 is integrally formed with the upper ends 266, 268.

Referring to FIG. 11A, the rear cover, hanger plate 270 is mounted on a rearwardly extending collar 280 on the D-ring body 212 and around the opening 230. The cut-out 272 is provided so that the hanger plate 270 avoids interfering with the anchor fastener 232 while providing stability to the rear cover member 252 and an additional location to mount the rear cover member 252 to the body 212.

Referring again to FIGS. 11A-12, the beam 264 of the rear cover member 252 also can have a curved, bent or slanted cross-section that extends on the rear side 216 of the body 212. The beam 264 extends downward until it terminates at a bottom edge 284 that abuts a bottom edge 286 of the front cover member 250.

At the center of beam 264 as shown on FIG. 11A, the beam has an upwardly extending support fin 288 that fits within space 240 between the front and rear rims 236, 238 of the load-bearing wall 218 on the D-ring body 212. The support fm 288 is shaped to at least generally position and hold the rear cover member 252 on the bearing wall 218 of the D-ring body 212 when the rear and front cover members 250, 252 are being attached to each other on the body. The support fin 288 cooperates with the front cover member 250 to cover grasp the front rim 236 of the bearing wall 218. The support fm 288 is smaller than space 240 so that the fin has a slight amount of room (in the front-to-back and up-down directions) to shift within space 240 between the rims 236, 238 (as shown in FIG. 11A). However, it will be appreciated that the support fin could be sized to provide a tight or snug snap-fit within space 240.

To connect the front and rear cover members 250, 252 to the rims 236, 238, an outer, upper edge 290 on the front cover member extends along and engages the groove 248 and covers the front periphery 242 and tab 246 on the front rim 236. An outer, upper edge 292 of the rear cover member 252 engages the rear rim 238 of the load-bearing wall 218 at its periphery 244. This configuration provides a much more aesthetically pleasing shape by covering at least a portion of the rims or flanges 236, 238. It will be appreciated, however, that the edges 290, 292 of the cover members 250, 252 may only cover certain areas or portions of the front and rear rims 236, 238 of the body 212.

The front and rear cover members 250, 252 are shaped to be shifted in the fore and aft directions A, B (shown in FIG. 10A) respectively to mate them together and clamp the cover members 250, 252 onto the D-ring body 212. In one embodiment as shown in FIGS. 9-12, the front and rear cover members 250, 252 are sonic welded to each other to clamp them to the body 212. The bottom edge 284 of the rear cover member 252 has an elongated, weld concentrator rib 294 shown in FIG. 11B in its pre-assembled state.

As shown in FIGS. 11A-12, once the front and rear cover members 250, 252 are placed on the body 212 and the weld concentrator 294 is placed against the outer edge 286 of the front cover member 250, the cover members 250, 252 are welded together along their bottom edges 284, 286 so that the weld concentrator 294 forms a weld which secures the bottom edge 286 of the front cover member 250 to the bottom edge 284 of the rear cover member 252. For this embodiment, any similar welding process that can be used to attach two distinct cover pieces together may be used. It will also be appreciated that the weld concentrator 294 could be placed on either or both cover members 250, 252. The weld concentrator 294 also extends continuously for about the entire length of the bottom edge 284 in one embodiment but may be spaced along edge 284 or placed only at specific points or areas along the edge 284 as long as the strength requirements for the connection are met by the weld. In one embodiment, the welding takes place at more than one location or point along the edges2 84, 286 in case one of the welds or a portion of the weld fails.

It will be appreciated that the front and rear cover members 250, 252 cooperate to cover at least a portion of the space 240 between the rims 236, 238, and in one embodiment as shown in FIG. 12, the covers 250, 252 completely enclose the space 240 although that need not always be the case. The front and rear cover members 250, 252 may be provided in a variety of configurations as long as the two cover members cooperate to cover the space 240 from front to back between the body's rims 236, 238. Thus, the covers may have patterned or arrayed structures, holes or beams, or may not cover the entire length of the rims 236, 238 so that only certain portions of space 240 are covered to save material costs or to provide a more aesthetically pleasing embodiment.

In another alternative embodiment (although not shown) the covering portions of the covers 250, 252, such as beams 254 and 264, have substantially the same but symmetrical cross-sections.

Referring now to FIGS. 13-17, in another embodiment a guide loop assembly 211 (generally indicated on FIG. 14) has front and rear cover members 213, 215 that are snap-fit together by, for example, hook and groove connections 255 (FIG. 17) or hook and slot connections 257 (FIG. 14), rather than welded together. All features of assembly 211 that are similar to features of assembly 210 have similar reference numerals.

Figure 13:
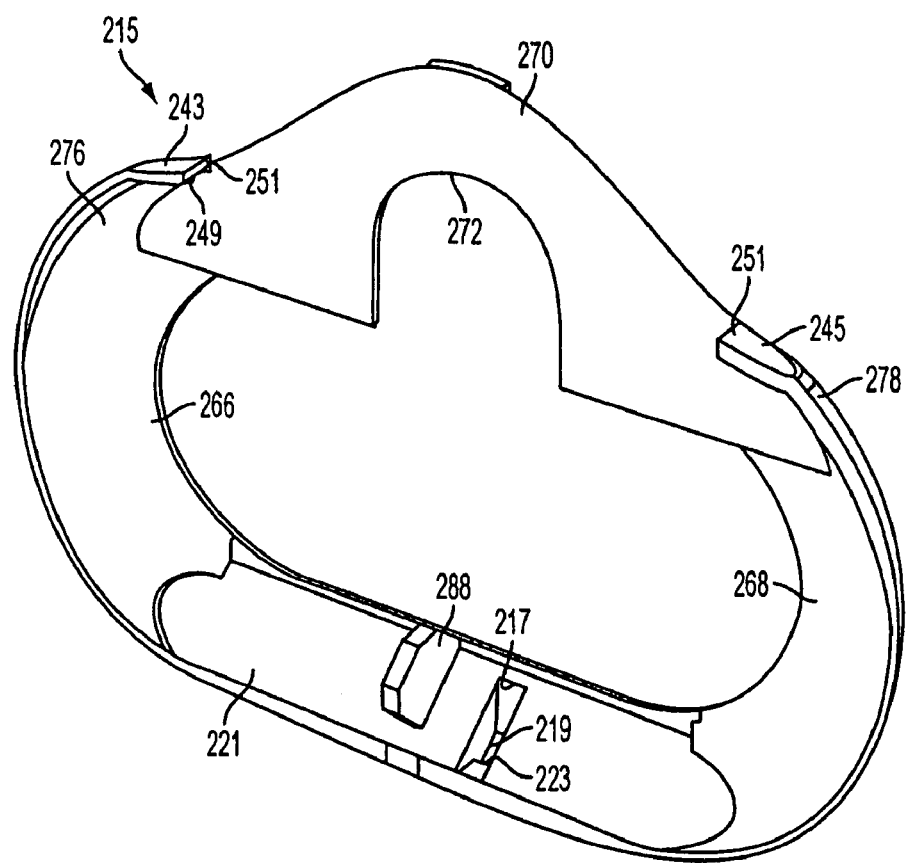
FIG. 13 is a front, perspective view of a rear cover member for an alternative, snap-fit guide loop assembly.
Figure 14:
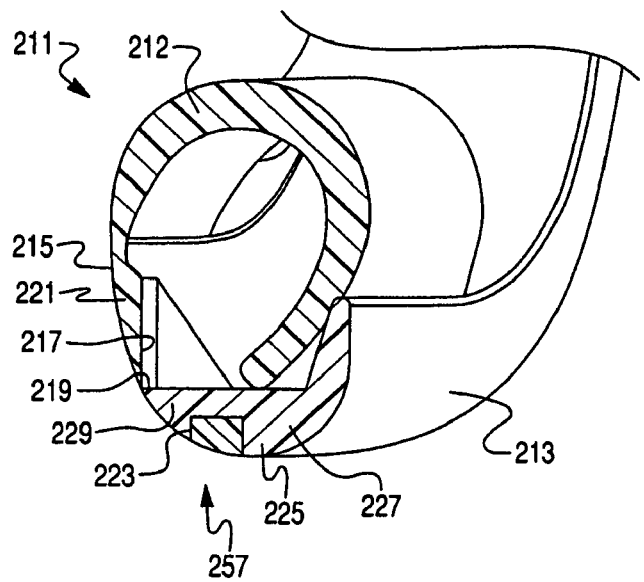
FIG. 14 is a close-up, cross-sectional, side view of a lower portion of the alternative guide loop assembly and showing the snap-fit engagement of the front and rear cover members to each other.
Figure 15:
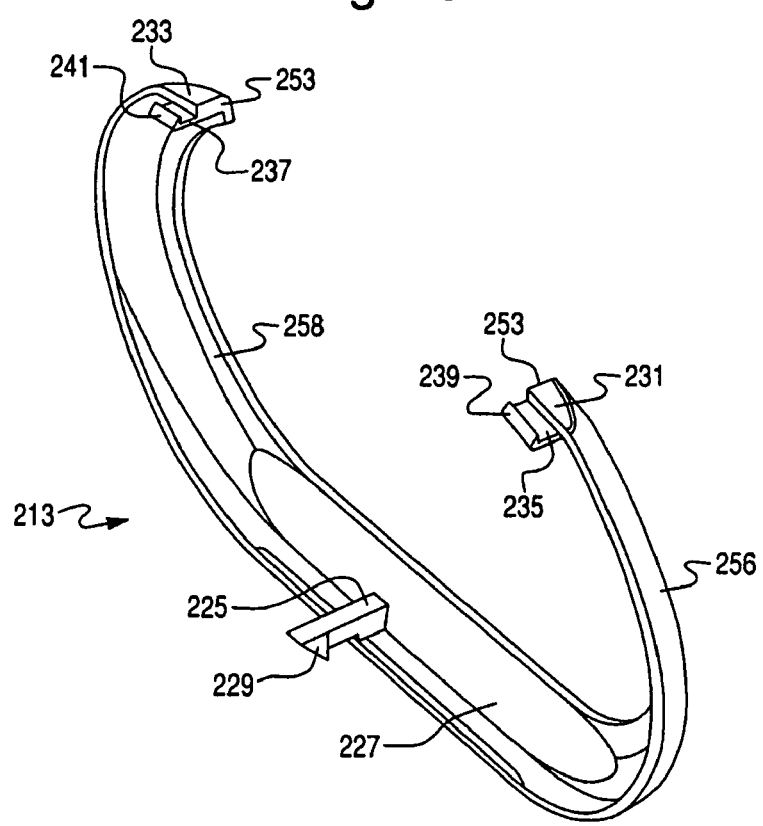
FIG. 15 is a rear, perspective view of a front cover member for the alternative guide loop assembly.

As shown in FIGS. 13-14, a rear cover member 215 has a bottom slot 217 that narrows to a rear opening 219 on a bottom beam 221. A locking edge or wall 223 forms a lower edge of the rear opening 219. As shown in FIGS. 14-15, a front cover member 213 has a hooked tab 225 extending interiorly and cantilevered from a bottom beam 227. The tab 225 extends in a front-to-back direction and has a distal hook end 229. When the front and rear cover members 213, 215 are pressed onto the body in the fore and aft directions A, B (indicated in FIG. 10A) the tab 225 slides rearward until it abuts the back of slot 217 and then slides downward until the hook end 229 is locked on the locking edge 223. It will be appreciated that either cover member 213, 215 could have the tab 225 or the slot 217 receiving the tab.

The upper portions of the front and rear covers 213 and 215 may also be attached to one another. To this end, as best seen in FIG. 7, a pair of symmetrical, top shoulders 231, 233 are respectively disposed on the upward extending curved pieces 256, 258 on the front cover member 213. The front, left shoulder 231 is disposed on the curved piece 256, and the front, right shoulder 233 is disposed on the curved piece 258 (left and right are defined while viewing the front cover member 213 on the front or exterior side of the cover member 213). Respectively, each shoulder 231, 233 has an interiorly extending, cantilevered hook 235, 237 with an upward extending tip 239, 241. As shown on FIG. 13, the rear cover member 215 also has rear, left and right shoulders 243 and 245 at the upper ends 276, 278 of curved pieces 266, 268 respectively, one shoulder 243 or 245 being disposed on the left and right of the hanger plate 270 and cut-out 272.

Figure 16:
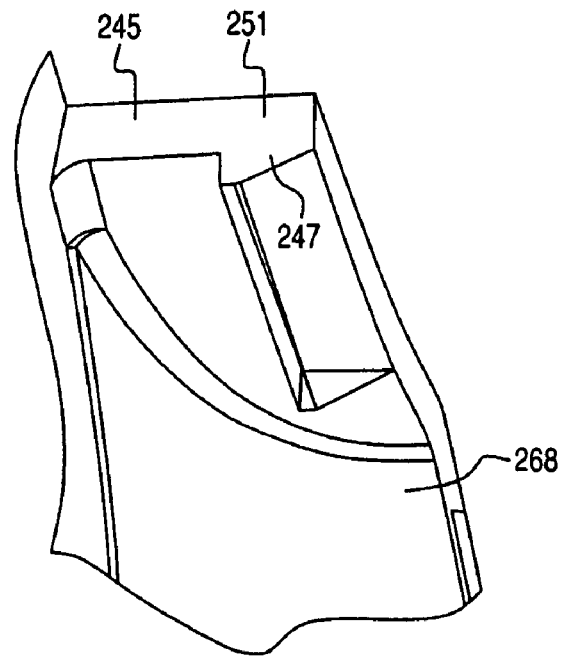
FIG. 16 is a close-up, bottom, perspective view of an exemplary shoulder on the rear cover member of the alternative guide loop assembly.
Figure 17:
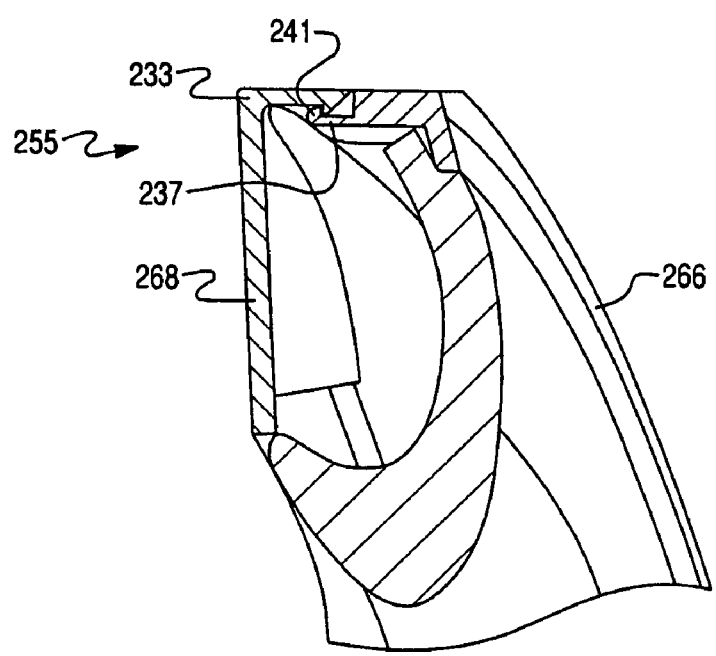
FIG. 17 is a cross-sectional, side view of the alternative guide loop assembly and showing the snap-fit connection of the shoulders of the front and back cover members.

As shown on FIG. 16, the top, right shoulder 245 has a downwardly extending projection 247 that engages the hook 237 as shown on FIG. 17. A projection 249 (shown on FIG. 13) on the rear, left shoulder 243 similarly engages the hook 235 on the front left shoulder 231, so that both top shoulders from both cover members 213, 215 can be snapped together. This three-point snap-on connection between front and rear cover members 213, 215 provides an efficient, inexpensive way to assemble the guide loop assembly 211 and secure the front and rear cover members 213, 215 to the body 212. The separate connections 255, 257 provide further safety in case one of the snap-fit connections fails or is unintentionally disengaged.

Referring to FIGS. 13 and 15, the hooks 235, 237 and projections 247, 249 are formed on outer edges 251 or 253 of the shoulders 231, 233, 243, 245 so that the snap-fit connections 255 themselves are disposed on the outer edges 251, 253 of the shoulders. This acts to further ease assembly when engaging the hooks 235, 237 on the projections 247, 249 so that one can slide laterally onto the other. It will be appreciated, however, that the snap-fit connections 255 may be shorter or longer or discontinuous (in the left and right direction relative to the front-rear direction of the guide loop assembly) than that illustrated and may be spaced away from the outer edges 251, 253 of the shoulders.

It will also be appreciated that the front and back covers may snap together at least at two separate locations, or even more than three locations. For instance, the front and back cover members 213, 215 may snap together only on the corresponding shoulders 231, 233, 243, 245 or only with one pair of engaging shoulders on the left or right, with or without the separate, lower tab 225 connection 257. It will also be appreciated a snap-fit connection between front and back cover members 213, 215 that engage in a front-back or fore-aft direction can be disposed anywhere along the rim of the cover members 213, 215 and may be built from projections extending from interiorly of a rim of the cover members 213, 215. Alternatively, the front and rear covers could be snap-fit onto a portion of the D-ring body, if it were redesigned to have portions that are snap-fit with the respective front and rear covers.

Figure 18:
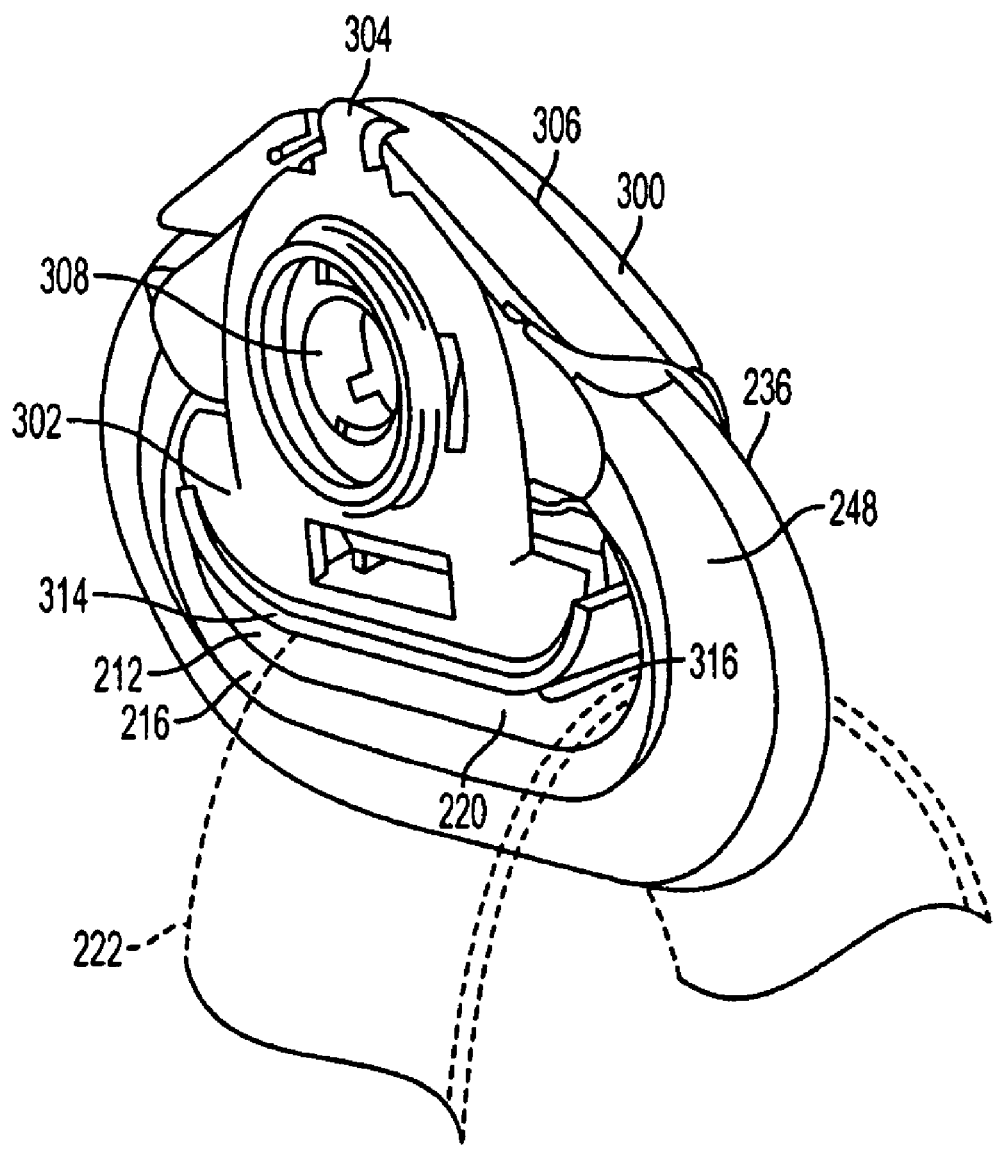
FIG. 18 is a rear and left perspective view of the assembled guide loop assembly of FIG. 9.

Referring now to FIGS. 11A and 18, the guide loop assembly 210 and 211 has an adapter 300 (also referred to as a guide member or protection member) with a rear base 302 connected by a hinge 304 to a front protection cover 306 (also shown in FIG. 9). In one form, the adapter 300 is a distinct component from the body 212 and the front and rear cover members 250, 252. As shown on FIG. 11A, the base 302 has an annular bearing portion, or bushing for mounting within the fastener receiving hole 230 in the D-ring body 212. Herein, this bushing or collar is in the form of a locking collar 308 as one example that has a distal end 326 with a plurality of hooks 328. The collar 308 extends through opening 230 on the body 212 to mount the base 302 on the rear side 216 of the body 212 while using the hooks 328 to engage and clamp onto the front side 214 of the body 212 on the upper mounting plate 228. The locking collar 308 is sized to permit the guide loop assembly 210 to rotate about the anchor fastener 232.

Referring to FIGS 10A-11B, the adapter also may be attached to the D-ring body at other locations such as at the bottom thereof. For instance, the adapter base 302 also has a locking tab 310 extending within opening 234 on the body 212 and has a hooked end 312 turned back to engage the upper mounting plate 228 on the front side 214 of the body in order to further secure the base 302 to the body.

Figure 19:
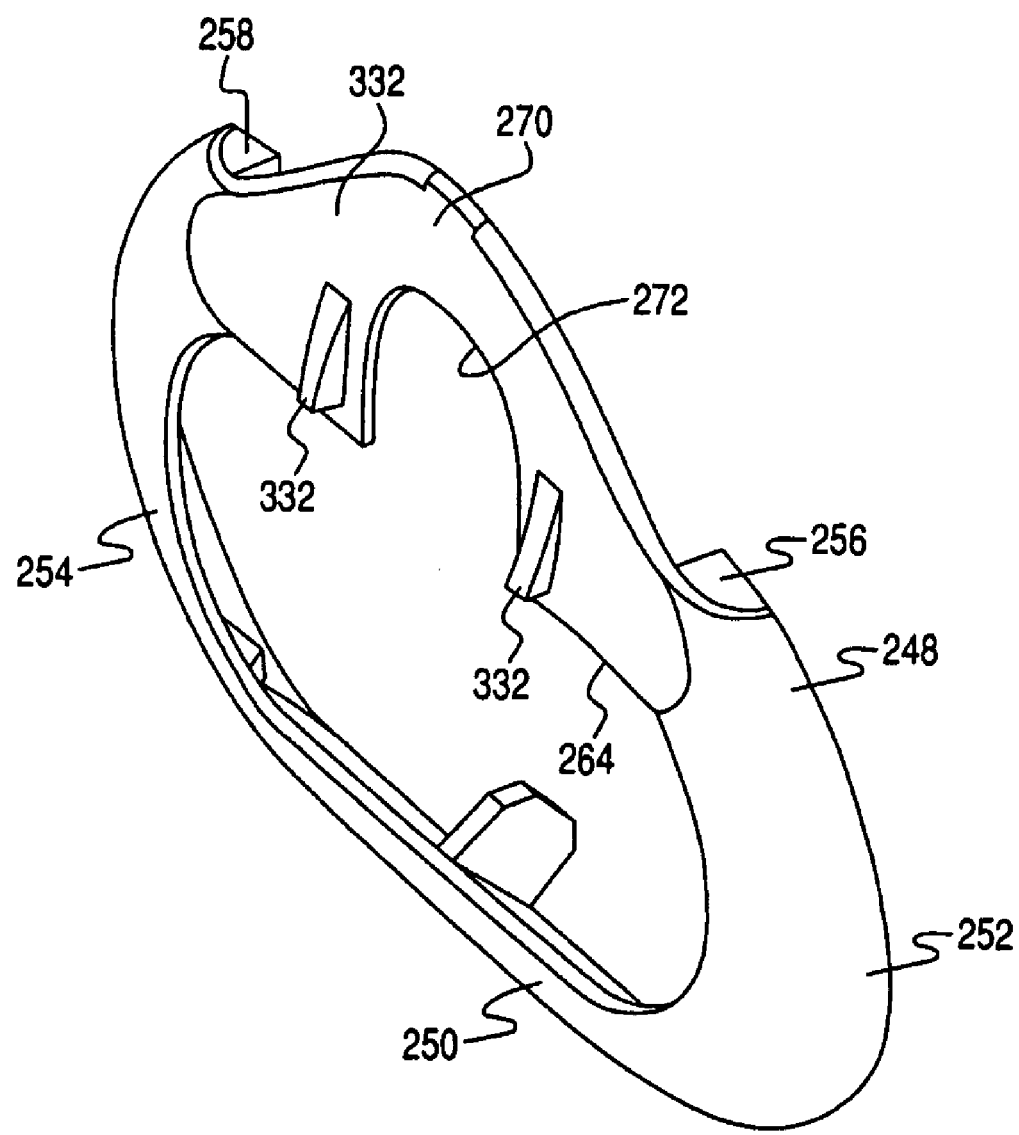
FIG. 19 is a rear, perspective view of a rear cover member for the guide loop assembly of FIG. 9.
Figure 20:
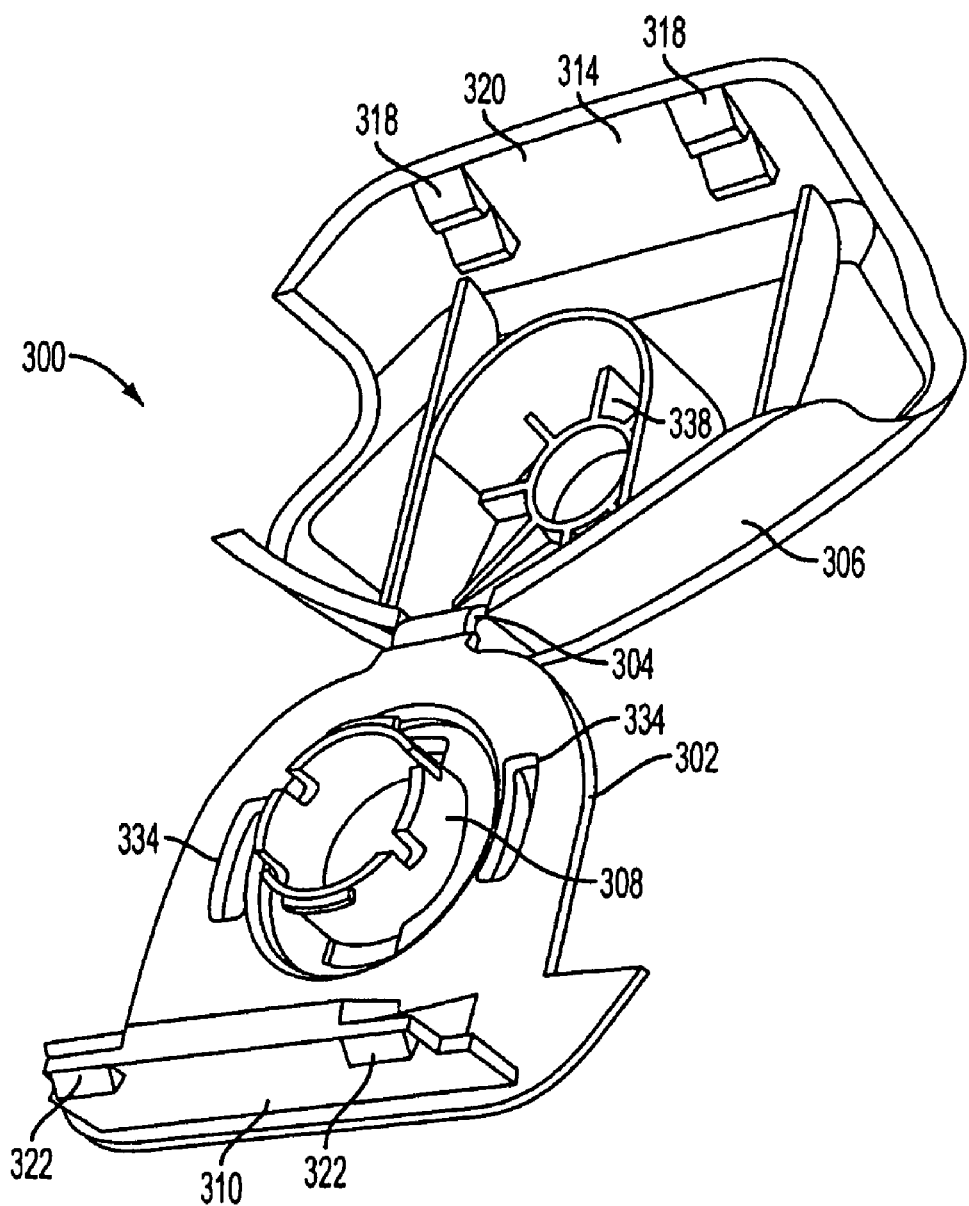
FIG. 20 is a perspective view of the internal sides of an adapter for the guide loop assembly of FIG. 9.

In the final installation of the adapter 300, the upper energy absorbing cover portion is pivoted down to cover the bolt fastener and then is secured in this operative position. For this purpose, as best seen in FIGS. 19-20, a back side 330 of the mounting plate 270 on the rear cover member 252 has two spaced, ramped, guide projections 332 that engage two guide slots 334 (shown on FIG. 20) formed on the base 302 of the adapter 300. These connections are provided to maintain alignment between the rear cover member 252, and in turn the body 212 and front cover member 250, and the adapter 300 when the adapter is mounted on the body 212 and when the guide loop assembly 210 is being rotated about fastener 232.

Referring again to FIGS. 10A-11B, the hinge 304 can be bent so that the front protection cover 306 is mounted on the front side 214 of the body 212 by attaching to the tab 310 on the base 302. With this configuration, the hanger plate 270 of the rear cover member 252 and the upper mounting plate 228 are clamped, and thereby secured between the base 302 and protection cover 306.

Referring to FIG. 11A, the protection cover 306 has a bottom wall 314 that extends to cover the upper portion of the opening 234 for the seat belt 222 in the D-ring body 212. The wall 314 is spaced from the bearing surface 220 so that a thin slot 316 is formed between them to restrict the vertical movement of the seat belt 222 on the guide loop assembly 210 and to maintain the seat belt in alignment with the bearing surface 220.

Referring to FIGS. 11A and 20, the protection cover 306 is secured to the base 302 by providing a pair of spaced, upwardly extending projections 318 (best seen on FIG. 20) on an interior face 320 of the bottom wall 314 that interlocks with a corresponding pair of projections 322 extending downward from locking tab 310. This configuration provides a simple snap-fit connection securing the adapter 300 on the body 212.

In one embodiment, the protection cover 306 is shaped to abut or oppose the end 336 of the anchor fastener 232 with energy absorbing fins 338 (also shown in FIG. 10A) in order to absorb forces received from an occupant impacting on the protection cover 306 and deforming the fins 338.

It will be appreciated that the cover members 250, 252 do not require an adapter 300 in all embodiments, and that the cover members could be self-securing such that they are secured to the body 212 without the aid of any adapter 300. As another alternative, adhesives, fasteners, clamps, or many other structures, if needed at all, can be used as additional structure for securing the front and rear cover members 250, 252 to each other and to the body 212 instead of an adapter.

It will also be appreciated that the guide loop assembly 10, 210 still falls within the scope of the invention even though it may be anchored to a vehicle in other ways other than simply mounting the assembly on an anchor fastener or anchor bolt on the wall of a vehicle.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A guide loop assembly for a seat belt, the guide loop assembly comprising:
   a core body having spaced front and rear flanges and an arcuate bearing surface for the seat belt extending therebetween; and
   an arcuate shell having a concave configuration relative to the arcuate bearing surface and extending between the front and rear flanges thereof, wherein the arcuate shell includes a shell portion and an adapter portion integral therewith, and
   wherein the shell portion and adapter portion include an integral hinge connector therebetween.

2. The guide loop assembly of claim 1, wherein the core body and arcuate shell include connecting structure for mounting the shell to the body.

3. The guide loop assembly of claim 1, wherein the body includes an elongate opening in which the arcuate bearing surface extends, and a mounting opening, the guide loop assembly further comprising:
   an annular bearing member for extending in the mounting opening; and
   a guide member distinct from the annular bearing member for being mounted to the body to extend on the elongate opening spaced from the bearing surface for forming a slot opening through which the seat belt extends.

4. The guide loop assembly of claim 3, wherein the arcuate shell and annular bearing member include an integral hinge extending therebetween, and the distinct guide member has at least one pivot shaft about which the hinge is bent for fitting the annular bearing member on the mounting opening.

5. The guide loop assembly of claim 1, wherein the body flanges form an open channel, the arcuate shell has an open channel facing the body open channel, and connecting structure in the respective channels for mounting the shell to the body.

6. A guide loop assembly for a seat belt, the guide loop assembly comprising:
   a body having a mounting opening for an anchor fastener and a bearing surface for the seat belt;
   an annular bearing member having a hinge for pivoting the bearing member to fit the opening; and
   an impact protection member for covering the mounting opening and anchor fastener therewith, and having a pivot portion for pivoting of the body thereabout.

7. The guide loop assembly of claim 6, wherein the impact protection member has a guide portion spaced from the bearing surface for forming a slot opening through which the seat belt extends.

8. The guide loop assembly of claim 6, wherein the hinge comprises a strap portion, and the pivot portion comprises at least one pivot shaft about which the strap portion is bent for pivoting the annular bearing.

9. The guide loop assembly of claim 8, wherein at least one pivot shaft comprises a pair of elongate pivot shafts each having an enlarged end oppositely disposed relative to each other for secure pivoting of the hinge strap Portion thereabout.

10. A guide loop assembly for a seat belt, the guide loop assembly comprising:
    a body having spaced front and rear flanges forming a space therebetween;
    a bearing surface for the seat belt extending between the front and rear flanges;
    a shell extending between the front flange and the rear flange for covering at least a portion of a space between the front and rear flanges;
    a base pivotally attached to the shell for pivoting the base relative to the shell and body to mount the base on the body; and
    a cover member distinct from the base member and attached to the base.

11. The guide loop assembly of claim 10, wherein the body generally forms front and rear sides, the base and cover member each being generally disposed on a different one of the sides of the body.

12. A seat belt device comprising:
    a seat belt; and
    a guide loop assembly for guiding and supporting the seat belt, the guide loop assembly including:
        a load bearing body with a load bearing wall and an opening through which the seat belt passes;
        a cover shell portion to cover at least a portion of the load bearing body;
        an impact protection member; and
        a base portion,
    wherein the base portion includes an integrally formed hinge configured to form a folding hinge connection with the impact protection member or the cover shell portion, and
    wherein the cover shell portion comprises a front cover and a distinct rear cover.

* * * * *